(12) United States Patent
Stegmaier (10) Patent No.: US 12,454,334 B2
(45) Date of Patent: Oct. 28, 2025

(54) METHOD FOR CONTROLLING A GEAR SHIFTING MEANS OF A BICYCLE

(71) Applicant: Robert Bosch GmbH, Stuttgart (DE)

(72) Inventor: Juergen Stegmaier, Wannweil (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/781,553

(22) Filed: Jul. 23, 2024

(65) Prior Publication Data

US 2025/0033741 A1 Jan. 30, 2025

(30) Foreign Application Priority Data

Jul. 24, 2023 (DE) .................... 10 2023 207 003.0

(51) Int. Cl.
*B62M 25/08* (2006.01)

(52) U.S. Cl.
CPC .................. *B62M 25/08* (2013.01)

(58) Field of Classification Search
CPC ...... B62M 25/08; B62M 9/133; B62M 9/123; B62M 6/45; B62M 6/55; B62M 9/122; B62M 9/132
USPC .......................................................... 474/70
See application file for complete search history.

(56) References Cited

U.S. PATENT DOCUMENTS

| | | | |
|---|---|---|---|
| 5,254,044 A * | 10/1993 | Anderson | B62M 25/08 474/70 |
| 10,167,056 B2 * | 1/2019 | Hashimoto | B62M 9/123 |
| 10,252,772 B2 * | 4/2019 | Sala | B62M 9/132 |
| 10,370,061 B2 * | 8/2019 | Wesling | B62M 9/123 |
| 10,507,885 B2 * | 12/2019 | Chen | B62M 9/133 |
| 10,640,171 B2 * | 5/2020 | Hamed | B62J 50/22 |
| 10,836,453 B2 * | 11/2020 | Tsuchizawa | F16H 61/66236 |
| 11,091,226 B2 * | 8/2021 | Tsuchizawa | B62M 25/08 |
| 11,383,783 B2 * | 7/2022 | Wesling | B62M 9/123 |
| 11,807,335 B2 * | 11/2023 | Jordan | B62M 25/08 |
| 11,932,347 B2 * | 3/2024 | Shahana | H04B 1/3827 |
| 11,964,725 B2 * | 4/2024 | Hahn | B62J 1/28 |
| 12,005,994 B2 * | 6/2024 | Hahn | B62J 45/41 |
| 2022/0388603 A1 * | 12/2022 | Hahn | B62J 45/41 |

FOREIGN PATENT DOCUMENTS

FR  3 116 796 A1  6/2022
WO  2022/112504 A1  6/2022

* cited by examiner

*Primary Examiner* — Henry Y Liu
(74) *Attorney, Agent, or Firm* — Maginot, Moore & Beck LLP (57) ABSTRACT

A method for controlling a gear shifting means or mechanism of a bicycle is disclosed. A reference shifting point is ascertained such that, when a gear change occurs at the reference shifting point, a change in pedaling frequency caused by the gear change is symmetrical to a reference pedaling frequency.

15 Claims, 6 Drawing Sheets

METHOD FOR CONTROLLING A GEAR SHIFTING MEANS OF A BICYCLE

This application claims priority under 35 U.S.C. § 119 to patent application no. DE 10 2023 207 003.0, filed on Jul. 24, 2023 in Germany, the disclosure of which is incorporated herein by reference in its entirety.

BACKGROUND

The present disclosure relates to a method for controlling a gear shifting means or mechanism of a bicycle, a shifting system of a bicycle, and a bicycle.

Shifting systems for bicycles that can be operated electronically are known. As a result, it is possible to provide automatic operation of a gear change. For example, certain shifting thresholds are provided to trigger such automatic operation of a gear change. Such shifting thresholds can be stored in the form of tables in a memory of a control device of the shifting system. With automatic shifting for bicycles, there is often a conflict between providing an optimal gear ratio for as high a pedaling comfort as possible for the rider of the bicycle and avoiding unnecessarily frequent gear changes.

SUMMARY

In contrast, the method according to the disclosure having the features set forth below offers the advantage of achieving automatic gear changes in a bicycle shifting mechanism in a simple manner, and a particularly high level of pedal comfort being reliably provided for a rider of the bicycle. According to the present disclosure, this is achieved by a method for controlling a gear shifting means or mechanism of a bicycle, whereby a reference shifting point is ascertained. During the method, the reference shifting point is ascertained such that, given a gear change at the reference shifting point, a change in pedaling frequency caused by such a gear change is symmetrical to a reference pedaling frequency.

In other words, a characteristic shifting threshold is ascertained in the form of the reference shifting point. When a shift operation, i.e. a gear change to an immediately adjacent gear, is performed at precisely this reference shifting point, such a gear change causes a particular change in pedaling frequency. Preferably, based on the previously known mechanical properties of the gear shifting means or mechanism, and preferably also the propulsion of the bicycle, the reference shifting point is automatically ascertained such that the corresponding change in pedaling frequency at that reference shifting point is symmetrical to a reference pedaling frequency.

In particular, the amount of difference between the respective pedaling frequency before and after the shift change is considered to be the change in pedaling frequency. In particular, a theoretical change in the pedaling frequency is considered to be a pedaling change in pedaling frequency, which results in the case of pedal operation before, during and after the gear change, in particular under tension from the bicycle's drive system. Such a change in pedaling frequency is, e.g., precisely defined on the basis of the mechanical relationships between the shifting system and the entire drive train of the bicycle.

In other words, the reference shifting point is defined such that, for example, when upshifting to a greater gear ratio, a pedaling frequency immediately prior to the gear change is greater than the reference pedaling frequency by a predetermined amount. At the same time, the pedaling frequency is less than the reference pedaling frequency by the same predetermined amount immediately after the gear change. For example, when downshifting to a smaller gear ratio, the change in pedaling frequency is precisely reversed in a corresponding manner.

Preferably, in a gear shifting means or mechanism comprising a plurality of different gear steps, i.e. a plurality of different gear ratios, a separate reference shifting point is ascertained for each gear step. Preferably, the reference pedaling frequency is identical for all of the gear steps. Alternatively, a different reference pedaling frequency can also be defined for different gear steps.

Therefore, the method offers the advantage of an optimal shift strategy being provided by ascertaining a reference shifting point at which respectively equal deviations from the reference pedaling frequency are present, in particular in minimal alignment with one another, immediately before and after the gear change. For example, a desired pedaling frequency by the bicycle rider can be used as the reference pedaling frequency. As a result, optimal regulation of the gear changing strategy with respect to the reference pedaling frequency can be performed using the method. In particular, since the pedaling frequency when operating the bicycle constitutes the essential perceivable factor for the rider with regard to efficient and comfortable operation, the method can thus also enable a particularly efficient and comfortable operation of the bicycle accordingly.

Preferred embodiments are also set forth below.

Preferably, a target shifting point is ascertained based on the reference shifting point and a shifting hysteresis. In detail, the target shifting point is ascertained such that the reference shifting point is shifted by the shifting hysteresis. The shifting hysteresis is in particular considered to be a certain amount of change by which the reference shifting point is shifted with respect to the target shifting point. For example, the shifting hysteresis can be considered as a pedaling frequency. Alternatively, the shifting hysteresis can be defined by a further physical variable, in particular as a function of which the reference shifting point is defined, e.g. preferably a speed value where the reference shifting point is located. Using an additional shifting hysteresis, an optimization of the shifting strategy can be performed such that a number of gear changes can be reduced. In other words, for example, undesirably frequent gear changes at or near the reference pedaling frequency can be avoided. The efficiency and rider comfort when operating the bicycle can therefore be further increased.

Particularly preferably, a target upshifting point and a target downshifting point are ascertained for each reference shifting point, respectively, by way of the shifting hysteresis. In particular, the reference shifting point is for this purpose moved in opposite directions by way of the shifting hysteresis. Preferably, a shifting point is considered to be a target upshifting point at which shifting occurs to a larger gear step, i.e. to a larger gear ratio. Further preferably, a shifting point is considered to be a target downshifting point, at which shifting occurs to a smaller gear step, i.e. to a smaller gear ratio. An automatic shift method can thus be provided particularly reliably and efficiently, which can avoid undesirable frequent gear changes.

Preferably, the target downshifting point is defined at smaller speeds, in particular in relation to travel operation of the bicycle, as compared to the reference shifting point. Alternatively or additionally, the target upshifting point is preferably defined at greater speeds, in particular in relation to travel operation of the bicycle, as compared to the reference shifting point. For example, when the speed is reduced and the pedaling frequency is thereby reduced as a result of the reference pedaling frequency being reached, shifting will not occur immediately, but only after a further speed reduction until the target downshifting point is reached. Preferably, the upshift occurs in an similar manner when the speed is increased. As a result, a high degree of riding comfort can be provided at optimal efficiency during operation of the bicycle.

Further preferably, the shifting hysteresis is equal to the respective target downshifting point and target upshifting point for each reference shifting point. In other words, the target downshifting point and the target upshifting point are arranged symmetrically with respect to the reference shifting point by the same shifting hysteresis. Alternatively, the shifting hysteresis is different from the respective target downshifting point and target upshifting point for each reference shifting point. In other words, by way of various shifting hysteresis values, the target downshifting point and the target upshifting point are arranged asymmetrically with respect to the reference shifting point.

Preferably, the shifting hysteresis corresponds to a predefined constant value. Alternatively preferably, the shifting hysteresis corresponds to a predefined constant percent deviation with respect to the reference shifting point. In other words, the shifting hysteresis can correspond to a change in the reference shifting point by, e.g., 5% or 10%. As a result, method can be performed in a particularly straightforward manner.

Preferably, the shifting hysteresis is designed to be variable. In other words, the shifting hysteresis can be variably adapted during operation of the bicycle, preferably in an automatically controlled manner. As a result, a particularly precise adaptation of the target shifting points to the current driving situation, and/or further factors, can be performed, e.g. adaptation to an individual rider request.

Particularly preferably, the shifting hysteresis is variably adapted as a function of one or more of the following parameters: current gear step, travel parameters of the bicycle, environmental parameters, user-specific input. In particular, these parameters can be acquired in a sensor-based manner and/or entered using an input device. For example, a speed, and/or a slope, and/or a slope, and/or an acceleration of the bicycle can be used as travel parameters. For example, the current slope on which the bicycle is traveling and/or road parameters, e.g. upcoming curves or a path be traveled, can be used as environmental parameters. As a result, the shifting strategy can be adapted to the bicycle's operation in a particularly reliable manner.

Preferably, the method further comprises the following step: ascertaining a shift speed at the target shifting point based on a gear ratio of the bicycle. In particular, the shifting speed is the speed at which the bicycle is traveling at the target shifting point, e.g. theoretically. This shifting speed is in particular specified by the mechanical relationship between, in particular theoretically, the pedaling frequency at the target shifting point and the gear ratio of the bicycle, in particular as a function of the corresponding gear step. In this case, an overall gear ratio of the bicycle is, e.g., considered between cranks and a rear wheel. A particularly straightforward determination of the advantageous shifting points can be performed as a result.

Preferably, the shifting speed can be ascertained at any time, e.g. even at a standstill and/or prior to initial operation of the bicycle. The shifting speed can, e.g., be stored as a characteristic value for the shifting system.

Further preferably, the method further comprises the following steps: acquiring a speed, in particular the current speed of the bicycle, and actuating a gear change when the acquired speed reaches the shifting speed. In other words, the initiation of the shifting operations occurs during the method as a function of the acquired speed, at which the bicycle is traveling. As a result, in addition to a particularly simple and inexpensive implementation of the method, a particularly advantageous shifting strategy can also be provided because it can, e.g., be independent of the current pedaling frequency with which the rider is pedaling the bicycle. For example, when going downhill and pedaling is not occurring, the optimal shifting point can be determined as a function of the speed such that the optimal gear step can, e.g., be engaged when pedaling is restarted.

Preferably, the method further comprises the following steps: ascertaining a shifting pedaling frequency at the target shifting point, acquiring a pedaling frequency, in particular the pedaling frequency at the current moment, and actuating a gear change when the acquired pedaling frequency reaches the shifting pedaling frequency. In other words, the initiation of the shift operations is dependent on the acquired pedaling frequency at which the rider is pedaling the bicycle. As a result, particularly precise control of the shifting operations can be provided for optimally regulating an advantageous pedaling frequency.

Preferably, the reference pedaling frequency is a predefined constant value. Alternatively preferably, the reference pedaling frequency is a constant value that can be specified by a user. Further alternatively, the reference pedaling frequency is preferably designed to be variable, and in particular can be set as a function of one or more of the following parameters: current gear step, travel parameters of the bicycle, environmental parameters. In particular, these parameters can be acquired in a sensor-based manner and/or entered using an input device. For example, a speed, and/or a slope, and/or a slope, and/or an acceleration of the bicycle can be used as travel parameters. For example, the current slope on which the bicycle is traveling and/or road parameters, e.g. upcoming curves or a path being traveled, can be used as environmental parameters. As a result, a particularly flexible and precise adaptation of the shifting strategy to the travel operation of the bicycle and/or to user-specific preferences can be performed.

Particularly preferably, the gear shifting means or mechanism of the bicycle comprises multiple different gear steps. A separate reference shifting point is in this case ascertained for each gear change between different gear steps. In other words, the shifting points are ascertained individually for each of the gear steps. As a result, the shifting strategy can be adapted particularly precisely to provide optimal riding comfort for the rider of the bicycle.

Furthermore, the disclosure leads to shifting system for a bicycle, preferably an electric bicycle, comprising a gear shifting means or mechanism and a control unit. The control unit is in this case configured to operate the gear shifting means or mechanism and to perform the method described. Preferably, the gear shifting means or mechanism comprises a derailleur configured to move a bicycle chain between sprockets of different sizes in order to thereby alter a gear ratio. Alternatively or additionally, the gear shifting means or mechanism can preferably comprise a gearshift mechanism. Particularly preferably, the gear shifting means or mechanism comprises an electronic actuation device, the control unit in particular being configured to operate the electronic actuation device of the gear shifting means or mechanism.

The disclosure further relates to a bicycle, preferably an electric bicycle, comprising the shifting system described.

BRIEF DESCRIPTION OF THE DRAWINGS

The disclosure is described hereinafter based on exemplary embodiments in connection with the drawings. In the drawings, functionally identical components are respectively denoted by identical reference signs. Shown are.

DETAILED DESCRIPTION

Figure 1:
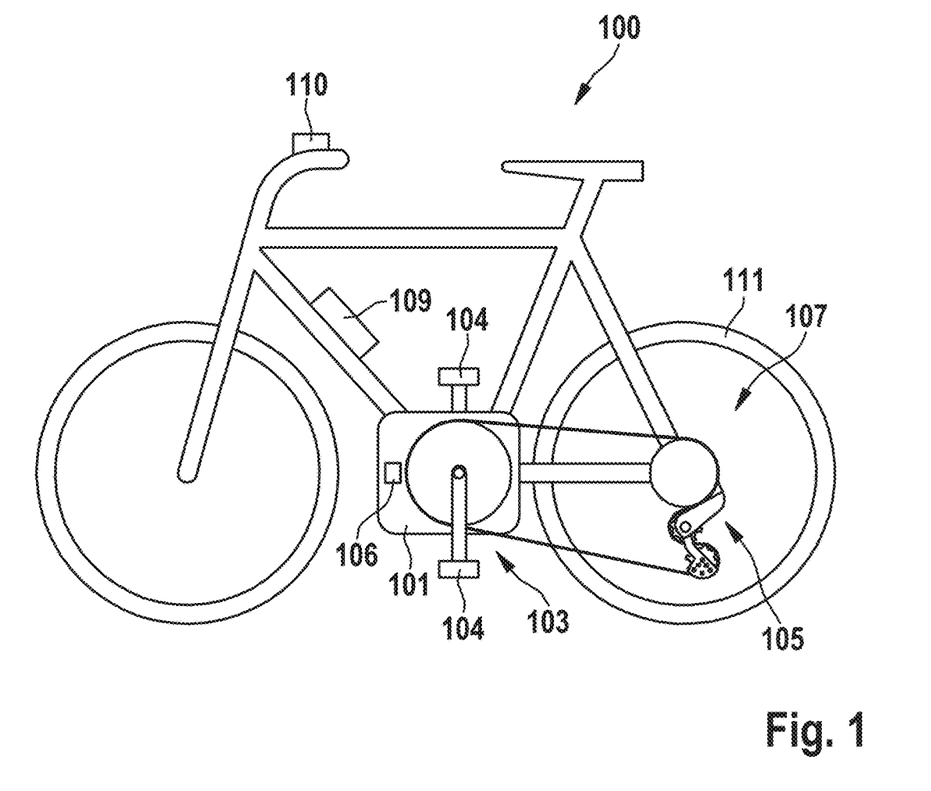
FIG. 1 a simplified schematic view of a bicycle in which a method for controlling a gear shifting means or mechanism of the bicycle is shown, according to a first exemplary embodiment of the disclosure, FIG. 2 an extremely simplified schematic view of the steps in the method of the first exemplary embodiment, FIG. 3 a simplified schematic view of shifting operations when performing the method of the first exemplary embodiment, FIG. 4 a simplified schematic view of shifting operations when performing the method according to a second exemplary embodiment of the disclosure, FIG. 5 an extremely simplified schematic view of the steps of a method according to a third exemplary embodiment of the disclosure, FIG. 6 a simplified schematic view of shifting operations when performing the method of the third exemplary embodiment, and FIG. 7 a simplified schematic view of shifting operations when performing the method according to a fourth exemplary embodiment of the disclosure.

FIG. 1 shows a simplified schematic view of a bicycle 100 comprising a shifting system 107, which comprises a gear shifting means or mechanism 105 and a control unit 106. The gear shifting mechanism 105 is a derailleur comprising a front derailleur and a plurality of variously sized sprockets, at least on one rear hub of the bicycle 100.

The gear shifting mechanism 105 comprises an electronic actuation device that, in response to receiving electronic actuation signals, causes a gear change, i.e., a change in the gear ratio of the drivetrain of the bicycle 100. The electronic actuation signals can be generated by the control unit 106. In particular, automatic shifting of the bicycle 100 can be provided in this case.

The bicycle 100 is an electric bicycle which comprises a drive unit 101, in particular comprising an electric motor. Preferably, the control unit 106 is integrated into the drive unit 101. The drive unit 101 can be supplied with electrical energy by way of an electrical energy storage mechanism 109 of the bicycle 100. The drive unit 101 can support the pedal force generated by the muscle power of a rider of the bicycle 100 with motor torque generated by an electric motor.

The control unit 6 is configured to perform a method 50 of, in particular automatically, controlling the gear shifting mechanism 105 of the bicycle 100. The method steps of the method 50 are shown schematically and in a highly simplified form in FIG. 2. Details of the shifting operations will be described in detail hereinafter. A general, highly simplified description of the method 50 will first be provided.

Figure 2:
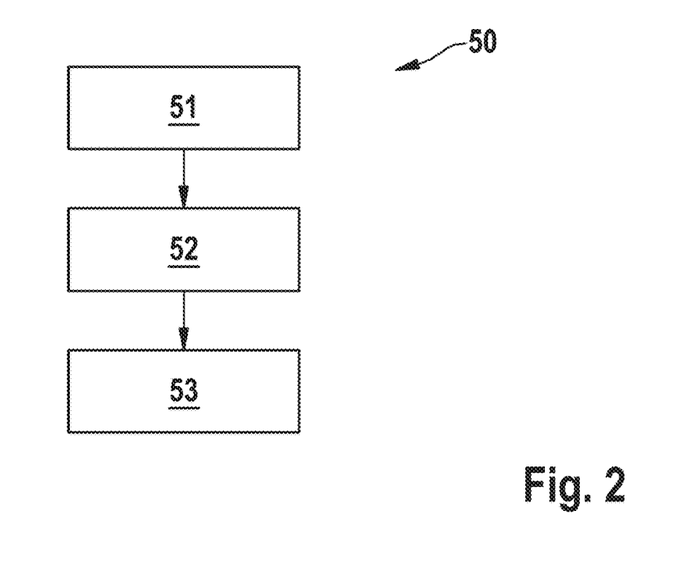

In step 51 of the method 50, an ascertainment of a reference shifting point 1 is performed and, based on this, a target upshifting point 31 and a target downshifting point 32 are ascertained.

At the target upshifting point 31, preferably as the speed 22 of the bicycle 100 increases, the next higher gear step is selected. At the target downshifting point 32, preferably at a decreasing speed 22 of the bicycle 100, it the next lower gear step is selected.

Also in step 51, a shifting speed 30 can be ascertained (where the corresponding shifting point is located) for each target upshifting point 31 and target downshifting point 32.

In step 52 of the method 50, acquisition of the current speed 22 of the bicycle 100 is performed. In step 53, the actuation of a gear change is performed when the acquired current speed 22 reaches one of the shifting speeds 30.

Figure 3:
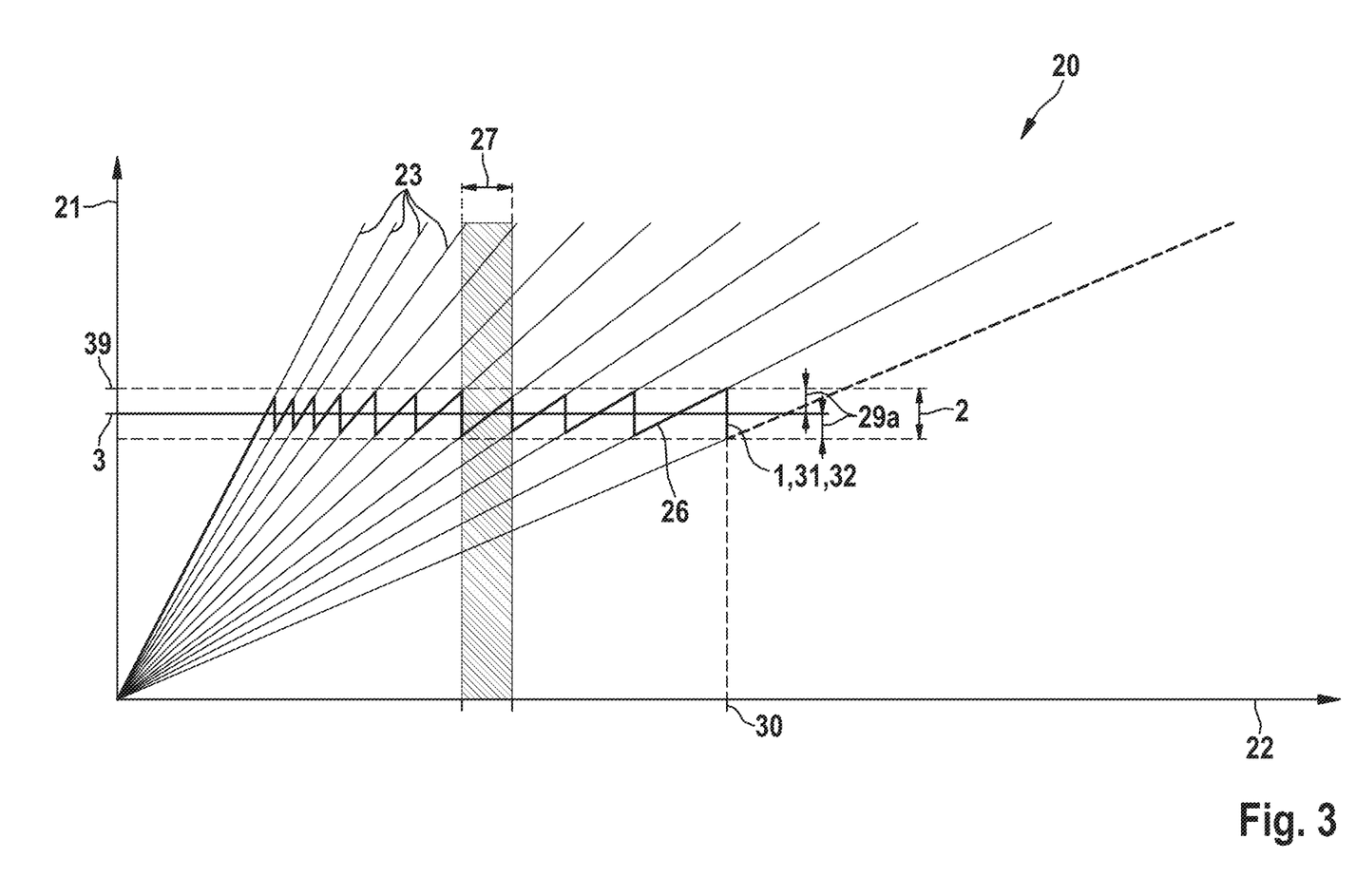

A more detailed description of the shifting points is provided hereinafter. The first exemplary embodiment of the method 50 shown in FIGS. 1 to 3 shows a particularly simple design variant of the method 50. The method 50 according to the second to fourth exemplary embodiments exhibits further variations.

The shifting points and gear changes described hereinafter are, by way of example, described based on a gear change between the two highest gear steps, i.e., between the two largest gear ratios. Preferably, the process described applies in a similar manner to all of the other gear steps of the gear shifting mechanism 105.

FIG. 3 shows a simplified schematic view of shifting operations when performing the method 50 of the first exemplary embodiment. FIG. 3 shows a so-called unfolding diagram 20 of the drive system of the bicycle 100. Depicted in the unfolding diagram 20 is a connection between a pedaling frequency 21 and a speed 22 for each of the gear steps of the gear shifting mechanism 105. The straight lines 23 represent the various gear steps of the gear shifting mechanism 105. These straight lines 23 are in this case rigidly defined by the respective mechanical properties of the drive system of the bicycle 100, in particular a mechanical transmission path between the pedals 104 and the rear wheel 111 of the bicycle 100. In particular, the respective slopes of the straight lines 23 are dependent on the respective gear ratio for each gear step.

The straight lines 23 with lower slopes (i.e., towards the bottom right in the unfolding diagram 20) in this case illustrate higher gears with larger gear ratios.

In the method 50, a reference pedaling frequency 3 is defined which is, e.g., a specified constant value. For example, the reference pedaling frequency 3 can be specified by the rider of the bicycle 100.

In particular, when operating the bicycle 100, each operating point of the shifting system 107 is located on an operating line 26, as indicated in FIG. 3. The operating line 26 is always on one of the straight lines 23, and when there is a gear change, there is a vertical jump to the adjacent straight line 23, as shown in FIG. 3.

In the first exemplary embodiment, a reference shifting point 1 is ascertained such that, given a gear change performed at the reference shifting point 1, a change in pedaling frequency 2 caused by this shift is symmetrical to the reference pedaling frequency 3. In the unfolding diagram 20, the change in pedaling frequency 2 corresponds to the amount of a pedaling frequency difference, i.e. a vertical distance, between the current straight line 23 and the adjacent straight line 23 that is jumped to during the gear change.

In other words, the reference shifting point 1 is selected such that, exactly at the reference shifting point 1, a partial amount 29a between the reference pedaling frequency 3 and the pedaling frequency 21 is the same in the gear step before and after the gear change.

In the first exemplary embodiment, the reference shifting point 1 thus ascertained also corresponds to a target upshifting point 31 and a target downshifting point 32, at which the upshift or downshift is actually initiated.

By way of the appropriately defined reference shifting points 1, and since they also correspond to the actual target shifting points in the first exemplary embodiment, a speed range 27 for each gear step can be gathered from the unfolding diagram 20 comprising the correspondingly defined operating line 26 as the area between two adjacent vertical changes in pedaling frequencies (as in FIG. 3, shown for gear eight by way of example).

Furthermore, a shifting speed 30 is ascertained during the method 50 for each target shifting point 31, 32 and, e.g., stored. During operation of the method 50, the actuation of the gear change is dependent on the speed, preferably exclusively. In other words, when the current speed of the bicycle 100 increases and the shifting speed 30 is reached for one of the gear steps, a shift to the next higher gear is actuated. Similarly, when the current speed of the bicycle 100 drops and the shifting speed 30 is reached for one of the gear steps, a shift to the next lower gear is actuated.

Preferably, the determination of all shifting points 1, 31, 32 can in this case be performed once, e.g. prior to the initial operation of the bicycle 100, using the control unit 106. Preferably, the respective shifting speeds 30 can be stored for all of the shifting points 1, 31, 32.

It is particularly advantageous if all gear changes are, in particular exclusively, actuated based on the current gear step and the shifting speeds 30 during operation of the bicycle 100. A particularly straightforward and reliable choice of gear steps in any driving situation is thus made possible in order to enable efficient and comfortable operation of the bicycle 100.

In an alternative embodiment, the actuation of the gear changes can be based on an ascertained shift pedaling frequency 39 at the target shifting point 31, 32 and an acquisition of the current pedaling frequency of the bicycle 100.

Figure 4:
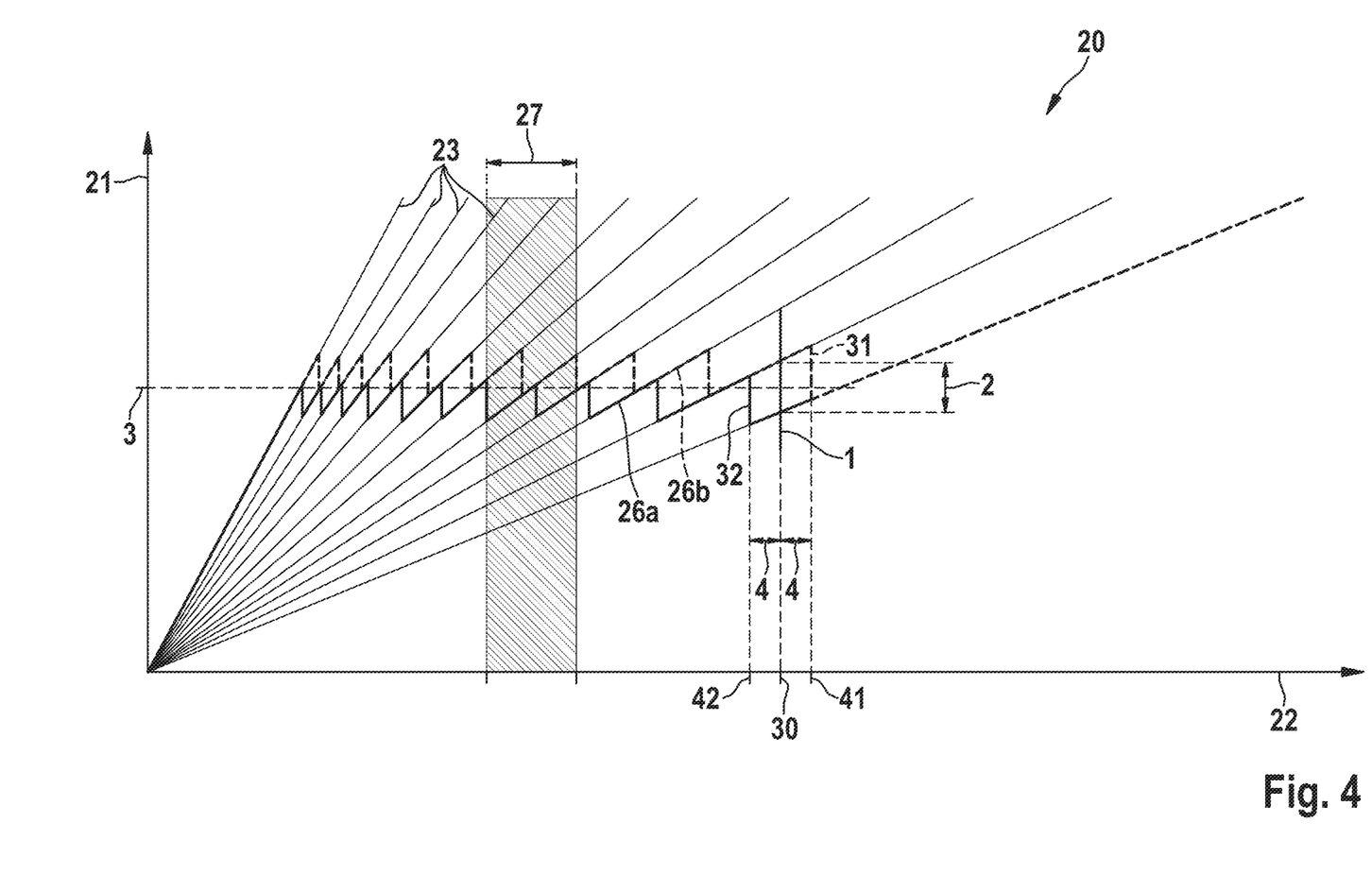

FIG. 4 shows a simplified schematic view of shifting operations when performing a method 50 according to a second exemplary embodiment of the disclosure. The second exemplary embodiment substantially corresponds to the first exemplary embodiment in FIGS. 1 to 3, with the difference that a shifting hysteresis 4 is additionally provided to determine the actual target shifting points 31, 32.

In detail, a separate target upshifting point 31 and a separate target downshifting point 32 are defined for each reference shifting point 1 in the second exemplary embodiment shown in FIG. 4. The target upshifting point 31 is defined as a result of the reference shifting point 1 being moved by the shifting hysteresis 4 towards higher speeds 22. The target downshifting point 32 is defined as a result of the reference shifting point 1 being moved by the shifting hysteresis 4 towards lower speeds 22. Therefore, the upshift at increasing speed 22 will not occur until later, at higher speeds 22, and the downshift at decreasing speed 22 will not occur until later, at lower speeds (in each case compared the reference shifting point 1). Therefore, an upshifting speed 41 also results for the target upshifting point 31, which is different from a downshifting speed 42 of the target downshifting point 32.

As a result, in the case of, e.g., more frequent speed changes close to the reference shifting point 1, it is significantly less likely that a gear change will be initiated. In particular, frequent undesirable back-and-forth shifting can therefore be avoided.

The shifting hysteresis 4 is defined in the second embodiment as a predefined constant percent deviation with respect to the reference shifting point 1. In detail, the shifting hysteresis 4 corresponds to 5% of the speed value of the reference shifting point 1.

As can be seen in FIG. 4, the shifting hysteresis 4 causes a wider speed range 27 for the individual gear steps, whereby these speed ranges 27 partially overlap due to the shifting hysteresis 4 (not shown).

In the exemplary embodiment shown in FIG. 4, the shifting hysteresis 4 is designed symmetrically with respect to the reference shifting point 1. In an alternative embodiment, an asymmetric shifting hysteresis 4 can also be provided. In other words, a different shifting hysteresis 4 is used for each reference shifting point 1 to ascertain the corresponding target upshifting point 31 than for ascertaining the corresponding target downshifting point 32.

Figure 5:
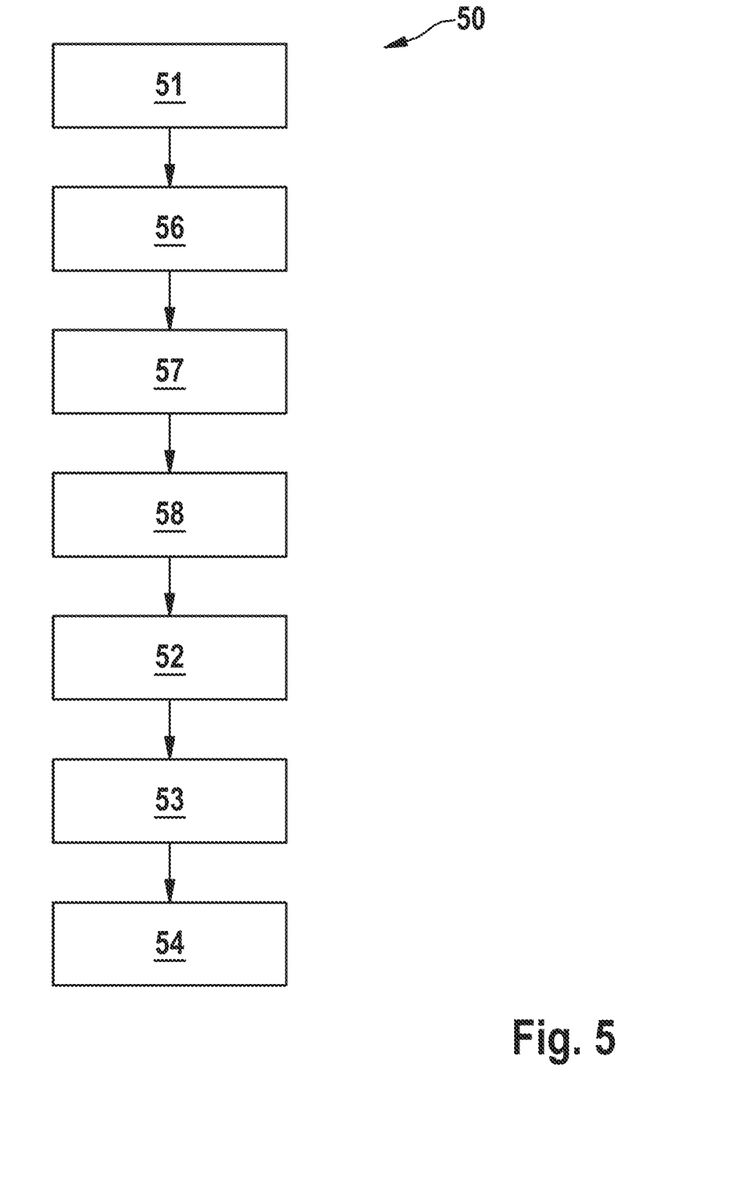

FIG. 5 shows a simplified schematic view of steps of a method 50 according to a third exemplary embodiment of the disclosure. The third exemplary embodiment substantially corresponds to the second exemplary embodiment in FIG. 4, with the difference that the shifting hysteresis 4 is designed to be adaptable to the current driving operation of the bicycle 100.

To this end, after step 51 of ascertaining the reference shifting point 1 and prior to step 52, the method 50 comprises the additional steps 56 to 58. In step 56, ascertainment of the current travel situation of the bicycle 100 is performed. Preferably, the current driving situation is in this case acquired and recognized using a sensor system 110 of the bicycle 100. Based on the driving situation thus ascertained, the current shifting hysteresis 4 is then adaptively adjusted during step 57. In step 58, based on the adapted shifting hysteresis 4, the target upshifting point 31 and the target downshifting points 32 are ascertained.

The adaptive adjustment of the shifting hysteresis 4 can be performed on the basis of a variety of characteristic driving situations. It is preferable to ascertain, based on the detected driving situation, whether either optimal control over the reference pedaling frequency 3 or alternatively, minimizing the number of shift changes is to be prioritized. In the first case, i.e. a preferred minimization of a deviation of an actual pedaling frequency from the reference pedaling frequency 3, in particular a low shifting hysteresis 4, e.g. a maximum of 10%, is set. This corresponds to, e.g., the unfolding diagram 20 in FIG. 4. In the second case, i.e. a preferred minimization of the number of shifts, in particular a high shifting hysteresis 4, e.g. more than 10%, is set.

In the method 20, predefined driving situations can be recognized, and predefined shifting hysteresis values 4 can be set in response thereto. As previously mentioned, using the method 50 according to FIG. 5, the unfolding diagram 20 in FIG. 4 can, e.g., be obtained by adaptively adjusting the shifting hysteresis 4 when constant travel is ascertained as the current travel situation. The constant travel can, e.g., be recognized when a substantially constant speed 22 is recognized. The shifting hysteresis 4 is in this case reduced to the comparatively low value of 5% in order to be able to precisely regulate the reference pedaling frequency 3.

Figure 6:
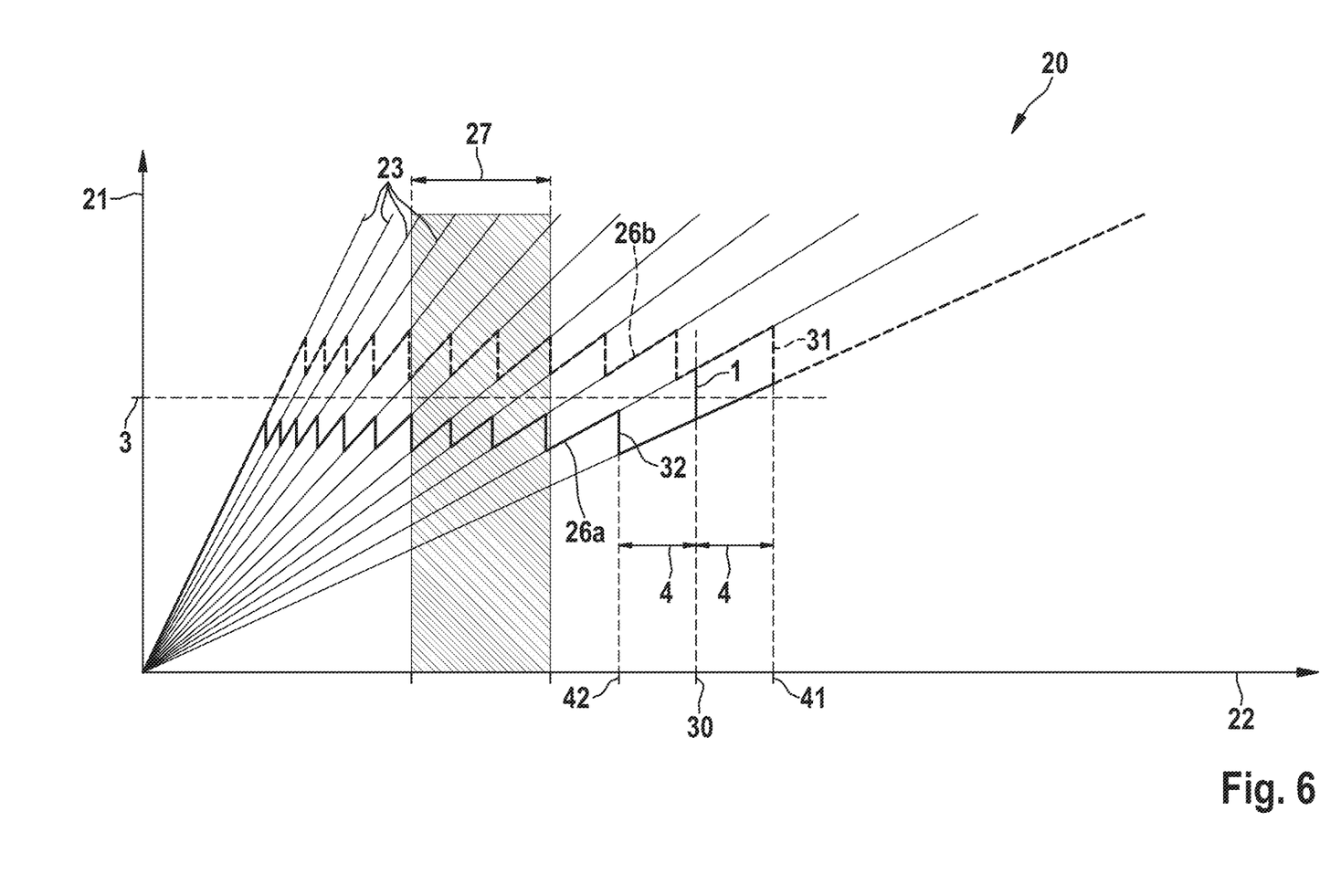

In the method 50 in FIG. 5, a determination of a pedal break as a current driving situation and/or a determination of an ascent as a current driving situation can also be made and, in response thereto, an increase in the shifting hysteresis 4 to, e.g. at least 15%, can be performed. A corresponding unfolding diagram 20 is shown in FIG. 6. As seen in FIG. 6, this results in an even wider speed range 27 for a single gear, and thus also a significantly greater overlap of the individual gears. As a result, a total number of shifts can be reduced as the bicycle 100 travels, which advantageously affects riding comfort for the rider in these travel situations.

Figure 7:
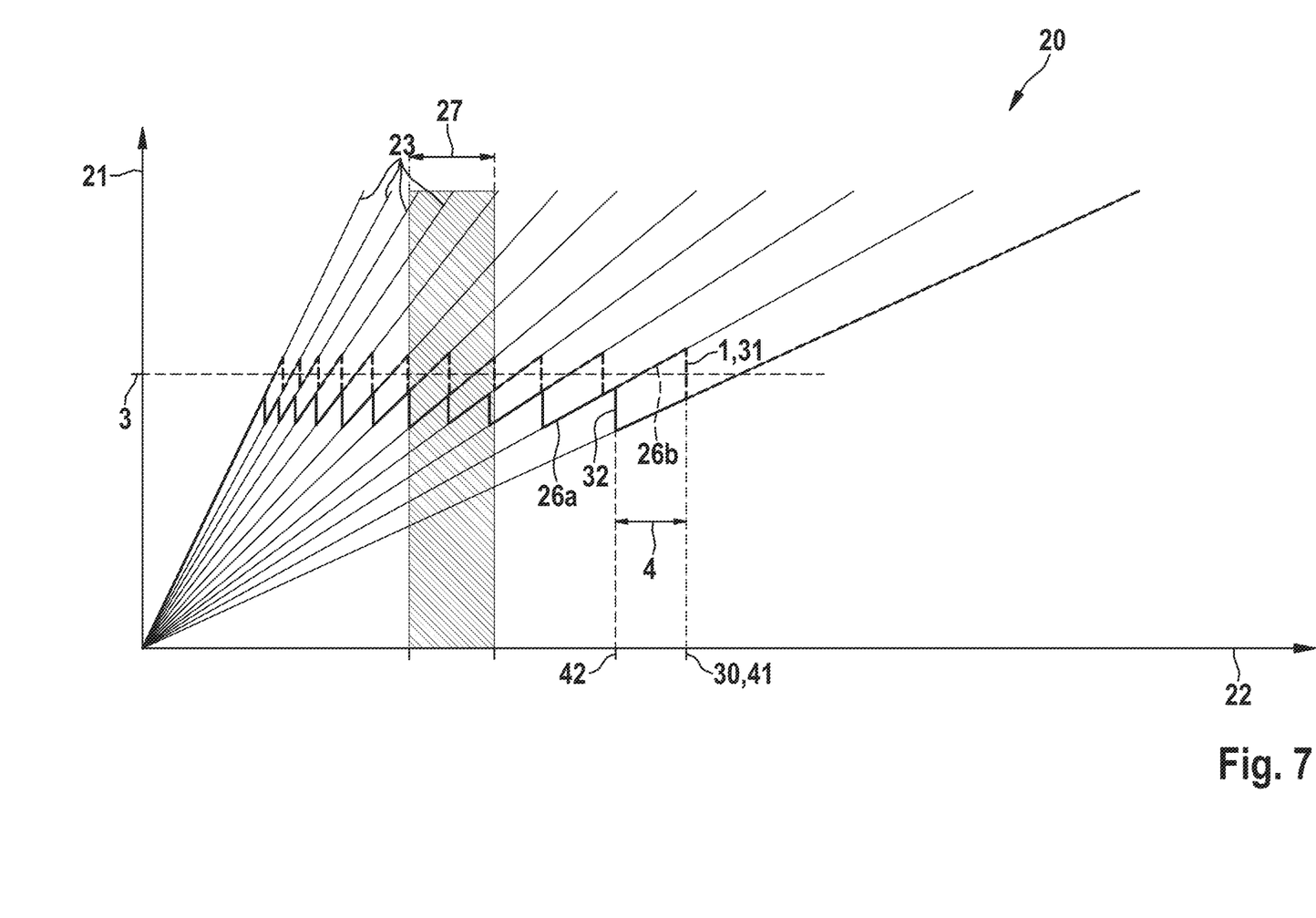

FIG. 7 shows a simplified schematic view of shifting operations when performing a method 50 according to a fourth exemplary embodiment of the disclosure. The fourth exemplary embodiment substantially corresponds to the third exemplary embodiment in FIGS. 5 and 6, and can in particular be considered a further development of the method 50 of the third exemplary embodiment, by way of a further additional driving situation. In the fourth exemplary embodiment in FIG. 7, an asymmetric adaptation of the shifting hysteresis 4 is performed in response to recognition of an acceleration as a current driving situation of the bicycle 100.

In this case, the shifting hysteresis 4 for the target upshifting point 31 is set to the value of zero, so the target upshifting point 31 corresponds to the reference shifting point 1.

At the same time, the shifting hysteresis 4 is maintained for the target downshifting point 32, or alternatively increased to, e.g., 15%. As a result, an optimal pedaling frequency, in particular close to the reference pedaling frequency 3, can always be regulated when accelerating the bicycle 100 across multiple gears by always shifting close to this frequency. Therefore, optimized riding comfort can also be provided for the rider of the bicycle 100 in this travel situation.

It should be noted that the described exemplary embodiments can be combined together in any manner desired. For example, any of the described exemplary embodiments can be provided for particular time periods and/or particular modes of operation of the bicycle 100.

What is claimed is:

1. A method for controlling a gear shifting mechanism of a bicycle, comprising ascertaining a reference shifting point such that, when a gear change occurs at the reference shifting point, a change in pedaling frequency caused by the gear change is symmetrical to a reference pedaling frequency.

2. The method according to claim 1, further comprising ascertaining a target shifting point by adapting the reference shifting point by way of a shifting hysteresis.

3. The method according to claim 2, wherein a target upshifting point and a target downshifting point are each ascertained for each reference shifting point by adapting the reference shifting point by way of the shifting hysteresis.

4. The method according to claim 3, wherein:
the target downshifting point is at lower speeds compared to the reference shifting point, and/or
the target upshifting point is at higher speeds compared to the reference shifting point.

5. The method according to claim 3, wherein the shifting hysteresis is the same or different for each reference shifting point compared to the respective target downshifting point and the target upshifting point.

6. The method according to claim 2, wherein the shifting hysteresis corresponds to a predefined constant value, or a predefined constant percent deviation with respect to the reference shifting point.

7. The method according to claim 2, wherein the shifting hysteresis is designed to be variable.

8. The method according to claim 7, wherein the shifting hysteresis is variably adapted as a function of one or more of the following parameters: gear step, travel parameters of the bicycle, environmental parameters, and user-specific input.

9. The method according to claim 2, further comprising:
ascertaining a shifting speed at the desired shifting point based on a gear ratio of the bicycle.

10. The method according to claim 9, further comprising:
acquiring a speed; and
actuating a gear change when the acquired speed reaches the shifting speed.

11. The method according to claim 2, further comprising:
ascertaining a shift pedaling frequency at the target shifting point;
acquiring a pedaling frequency; and
actuating a gear change when the acquired pedaling frequency reaches the shift pedaling frequency.

12. The method according to claim 1, wherein the reference pedaling frequency is a predefined constant value, or is a user-definable constant value, or is variable as a function of one or more of the following parameters: gear step, travel parameters of the bicycle, and environmental parameters.

13. The method according to claim 1, wherein:
the gear shifting mechanism of the bicycle comprises multiple gear steps, and
a separate reference shifting point is ascertained for each gear change between all of the gear steps.

14. A shifting system of a bicycle, comprising:
a gear shifting mechanism; and
a control unit configured to operate the gear shifting mechanism,
wherein the control unit is further configured to perform the method according to claim 1.

15. An electric bicycle, comprising a shifting system according to claim 14.

* * * * *